United States Patent [19]
Forester

[11] Patent Number: 5,099,539
[45] Date of Patent: Mar. 31, 1992

[54] TELESCOPING EXTENSION ROD HAVING PIVOTABLY ADJUSTABLE TOOL HEAD

[76] Inventor: Glen R. Forester, 13039 107A Avenue, Surrey, British Columbia, Canada, V3T 2G9

[21] Appl. No.: 624,196

[22] Filed: Dec. 6, 1990

[51] Int. Cl.$^5$ ............................................. B05C 17/02
[52] U.S. Cl. ................... 15/143 B; 15/144 B; 15/145; 16/115; 156/579; 294/19.1
[58] Field of Search ............. 15/143 B, 144 R, 144 B, 15/235.4, 235.8; 16/115; 294/19.1; 156/579

[56] References Cited

U.S. PATENT DOCUMENTS

| | | | |
|---|---|---|---|
| 2,168,121 | 8/1939 | French | 15/144 B X |
| 2,616,741 | 11/1952 | Ziese | 294/19.1 |
| 3,090,984 | 5/1963 | Dunnigan | 15/235.4 |
| 3,317,997 | 5/1967 | Hedstrom et al. | 294/19.1 X |
| 3,707,427 | 12/1972 | Erickson | 156/579 X |
| 4,592,797 | 6/1986 | Carlson | 15/235.4 X |
| 4,647,094 | 3/1987 | Bergkuist et al. | 294/19.1 X |
| 4,819,293 | 4/1989 | Nicholson | 16/115 X |
| 4,863,204 | 9/1989 | Peters | 294/19.1 |

Primary Examiner—Chris K. Moore
Attorney, Agent, or Firm—Hughes & Multer

[57] ABSTRACT

An extension rod assembly for manually positioning a tool head in contact with a work surface comprises an extension rod, a pivotable tool head, and a control linkage for locking the tool head in a selected angular position relative to the extension rod. The control linkage comprises an elongate connecting member which extends through the rod, a manually operable handle at the control end of the rod, and a clutch mechanism which is operated by the handle. The clutch has a first position in which it is disengaged from the connecting member, and a second position in which it is frictionally engaged to the connecting member in order to exert a linearly-directed force on the connecting member so as to actuate a locking assembly which locks the tool head in position. In the disengaged position, the clutch permits linear movement of the connecting member past the clutch and handle as tubular portions of the extension rod are telescoped to a desired length. In this manner, operation of the handle to select the disengaged position permits the operator.

23 Claims, 10 Drawing Sheets

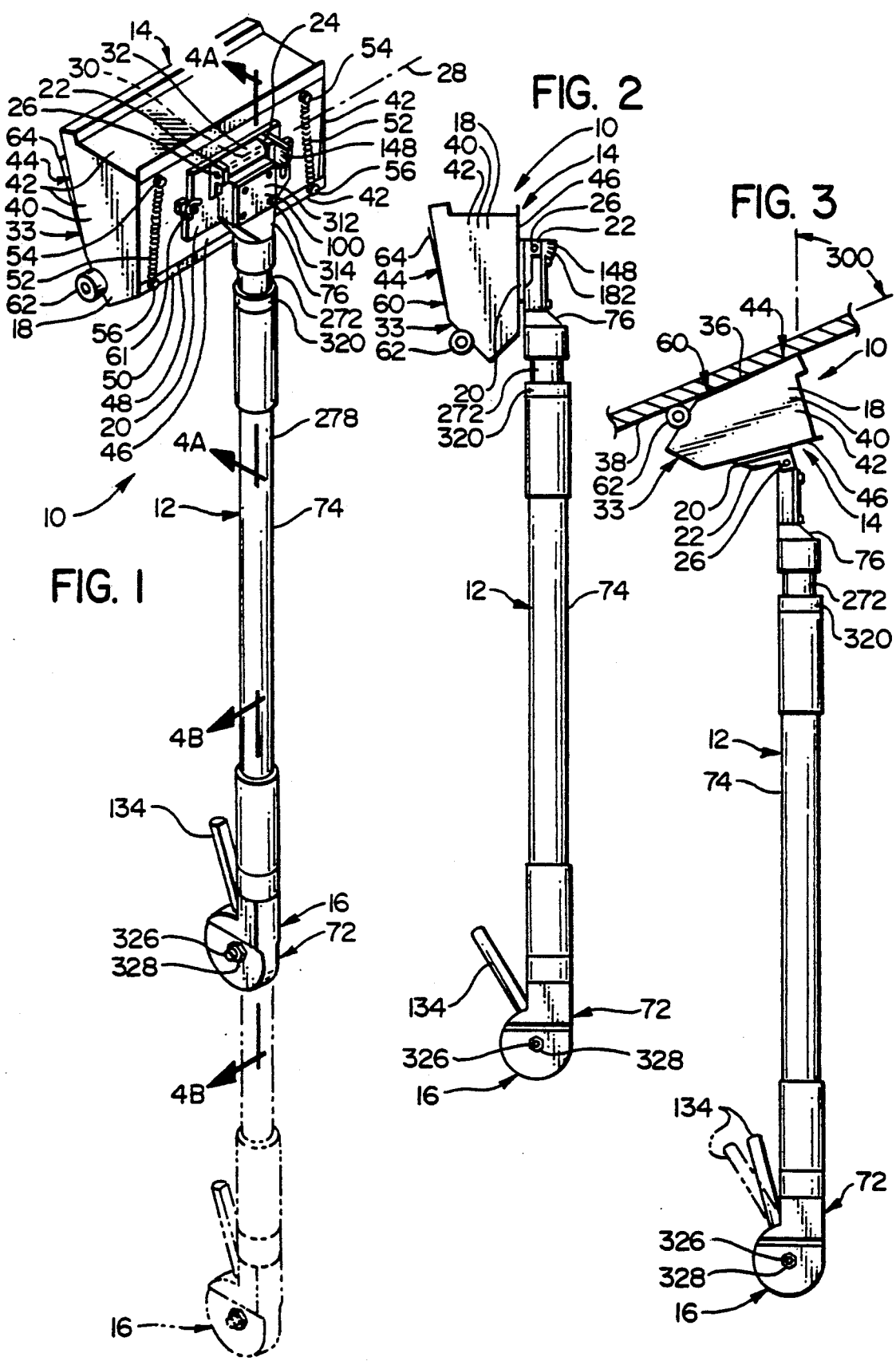

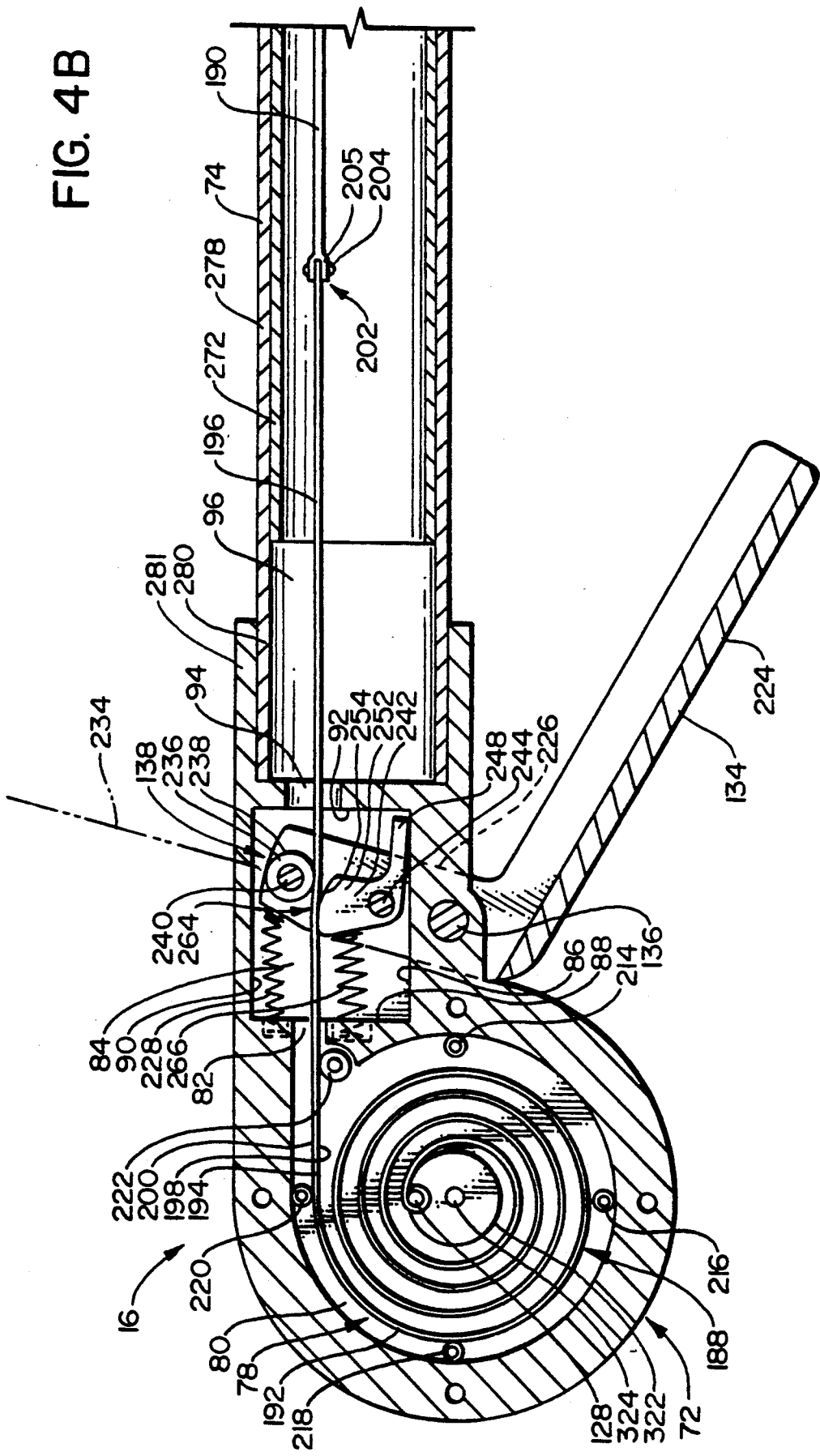

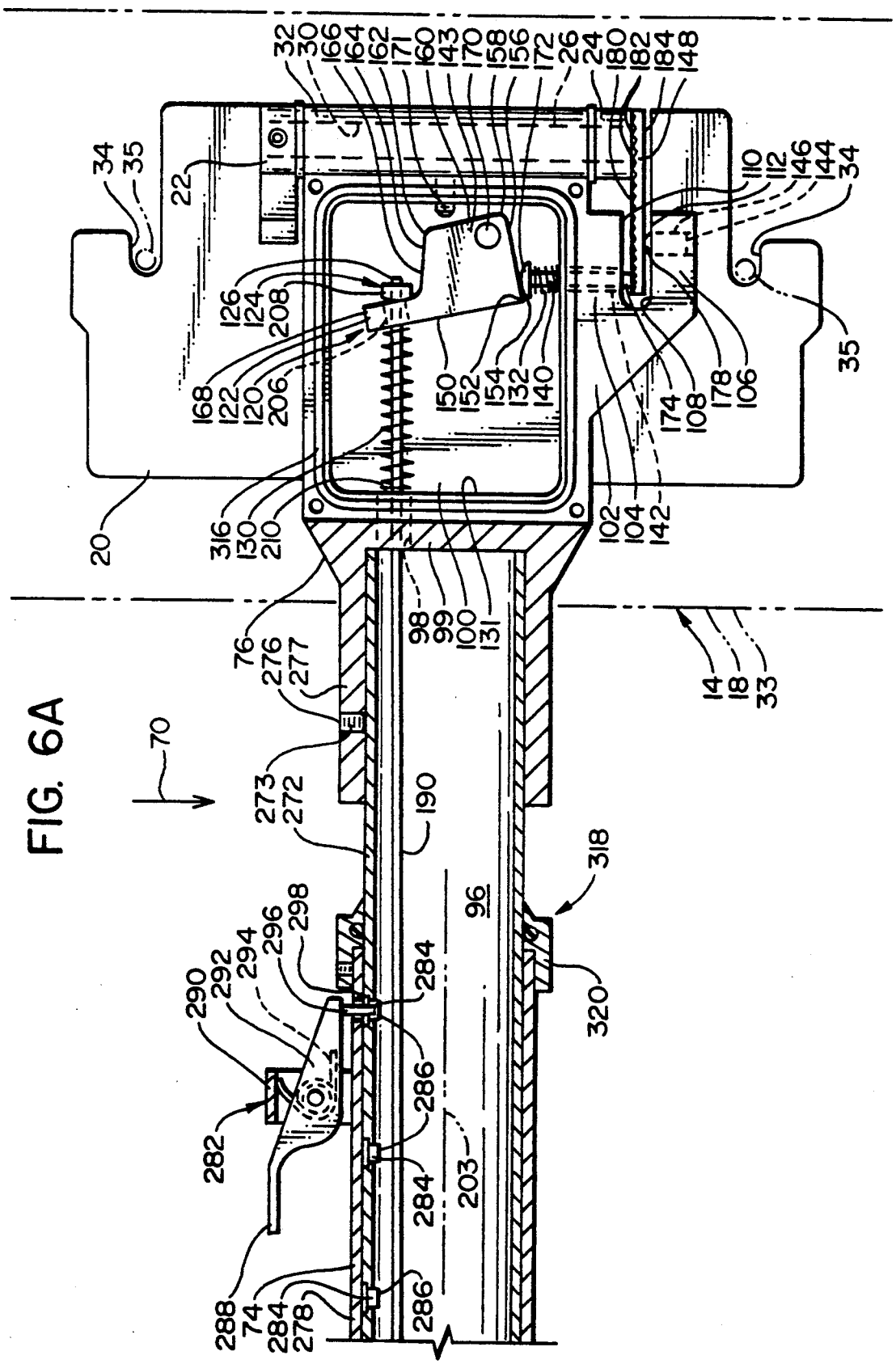

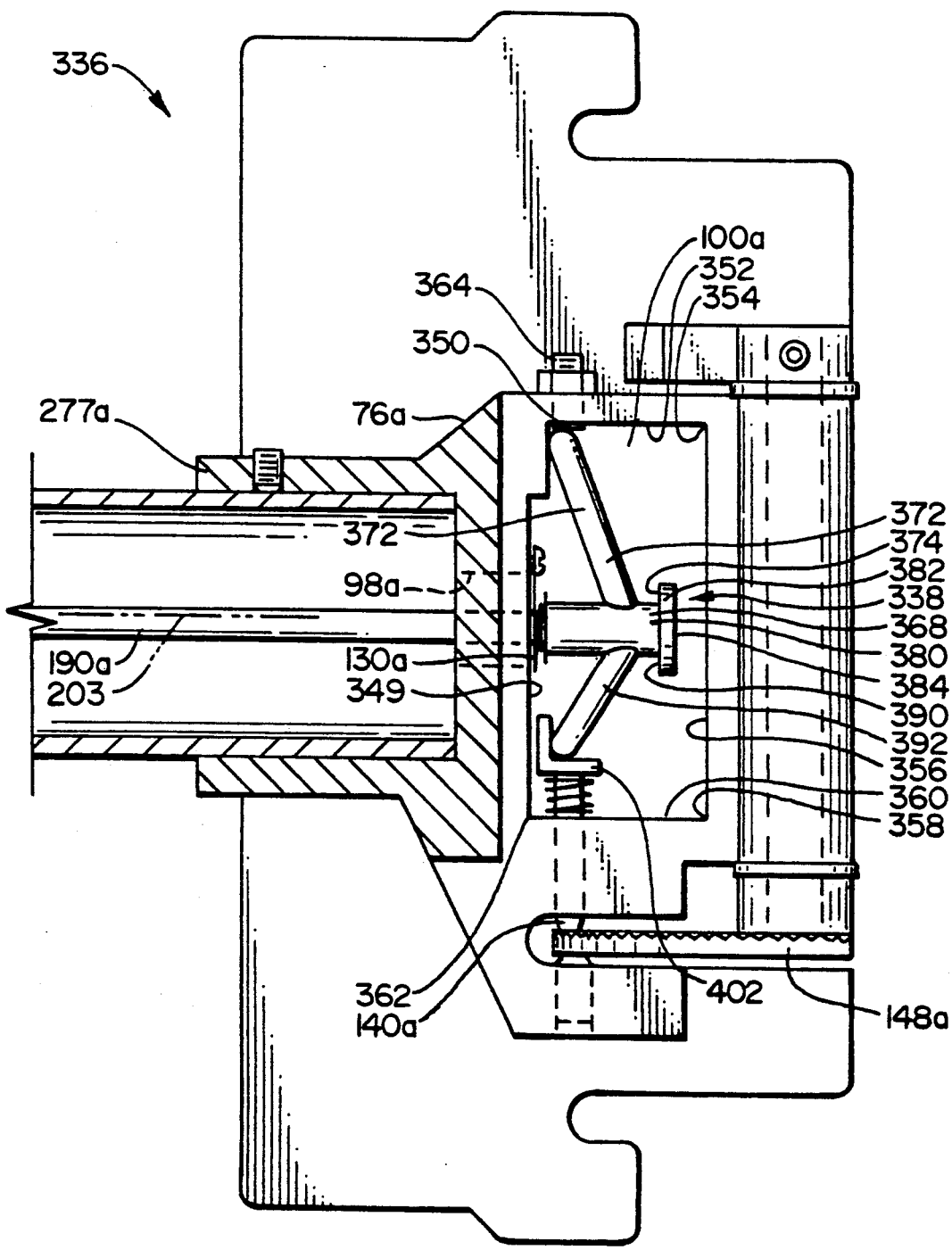

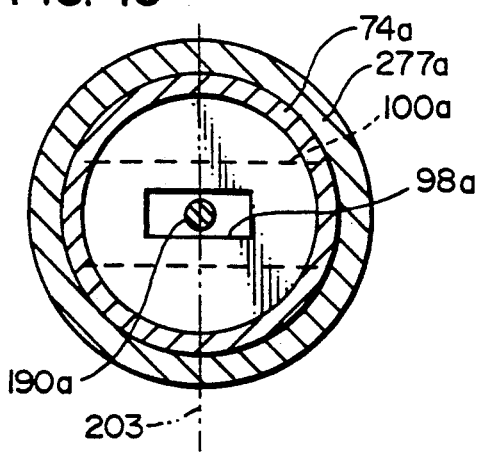
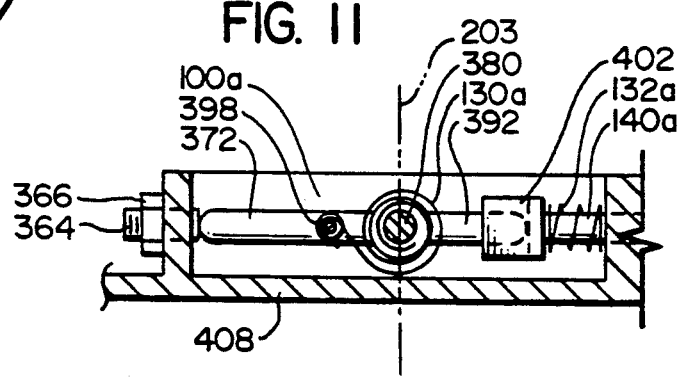
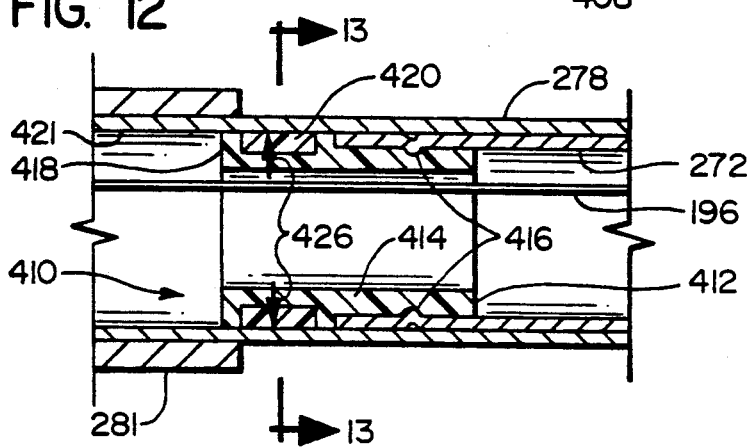
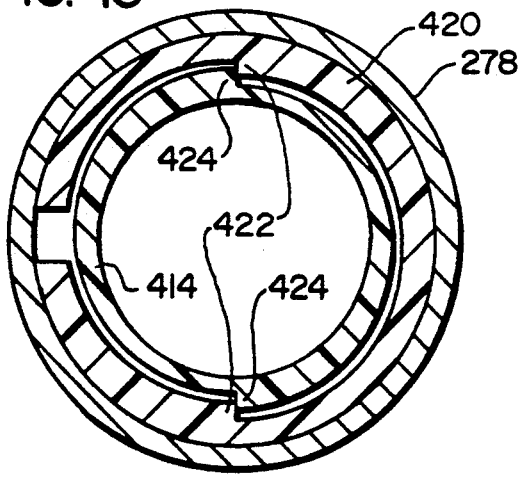
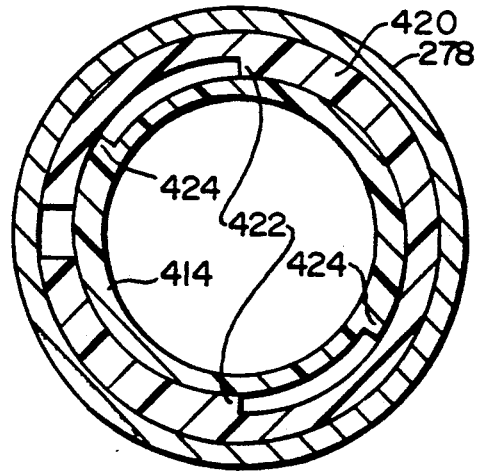

TELESCOPING EXTENSION ROD HAVING PIVOTABLY ADJUSTABLE TOOL HEAD

The present invention relates generally to handheld tools having tool heads mounted on extension rods, and more particularly to such tools, and methods for using the same, where a manually graspable handle is employed to adjust the angular position of the tool head, and the length of the extension rod is selectively adjustable.

BACKGROUND ART

Tools are well known that combine an adjustable or rotatable tool head with a rod to extend a person's reach. Examples of such tools include a rod-borne drywall finishers, cement and plaster trowels, sanders, squeegees, and the like. Typically the tool head is made adjustable or rotatable relative to the rod in order to enable the head to assume a suitable position relative to a work surface. For example, the tool head of a typical rod-borne drywall finisher is tiltable in a manner which enables the flat tool surface of the head to be positioned parallel to the drywall surface.

Some such known tools are provided with linkages which permit the selective positioning of the tool head in response to a simple and convenient squeezing or closing motion of the operator's hand on a handle at the grip end of the rod, remote from the tool head. The manually squeezable handle is connected by one or more linking members to a lock mechanism which locks or unlocks the head in selected angular positions. A problem with these known types of mechanisms is that the linkages have not been satisfactorily incorporated in a tool that also has a telescoping, adjustable-length extension rod. Although a telescoping rod having a tool head which is controllable from a remote end of the rod is seen in U.S. Pat. No. 2,834,199 (Freeman), the tool shown therein sacrifices the squeezable handle and linkage. Rather, the Freeman device, a tiltable head 10 is pivoted to the desired tilt angle by rotating or twisting the rod 37. which requires twisting by the person's hands. Consequently, this adjustment cannot be achieved by a simple and convenient squeezing motion.

Other devices are known for remotely controlling the positioning or operation of tool heads mounted on extension rod, however, these also fail to show any such mechanism which can be operated by a simple squeezing motion of the operator's hand and which can be used in combination, with an adjustable-length extension rod:

U.S. Pat. No. 4,819,293 (Nicholson) shows a pull ring 68 connected to a wire 66 which runs internally through a pole to a pin member 58 for locking and unlocking a rotatable head 42.

U.S. Pat. No. 4,702,641 (Naser et al) shows a concrete working tool wherein rotation of the pole actuates a worm gear and a toothed rack to cause the head to assume various angular positions.

U.S. Pat. No. 4,335,485 (Paine et al) shows another trowel wherein rotation of the pole rotates a worm gear which turns another gear which causes the head of the tool to assume different tilt angles.

U.S. Pat. No. 3,616,483 (Mantelet) shows, in a first embodiment (FIG. 6) a rotatable crank handle 16 which turns a pinion which moves racks 56, 58 in opposite directions, this causing an internal cable 60, 62 to rotate a gear 66 which wrings a mop head. In a second embodiment (FIG. 9), movement of a slideable outer sleeve handle 70 pulls an endless cable 72 to rotate gear 66. which again wrings the mop head.

U.S. Pat. No. 3,146,4891 (Chiuchiarelli) shows a concrete trowel in which rotation of a pole causes the angular position of the trowel head to change. In this case concentric threaded sleeves form an assembly which extends from the end of the pole and which changes length when the pole is rotated, so as to pivot a trowel head which is pivotably mounted at spaced-apart points to this assembly and to a fixed-length connector 17.

U.S. Pat. No. 2,861,287 (Scalf) shows a pole having a handle 30 at its end which is connected via an internal cable to a lock mechanism which locks and unlocks a mop head as the handle is pulled.

U.S. Pat. No. 2,607,363 (Frey) shows an umbrella pole in which an angular position of the umbrella is changed by means of an internal linkage which is actuated by a rotatable handle.

U.S. Pat. No. 1,162,845 (Armstrong) shows a grippable lever 26 which operates a cable which extends along a fixed-length shovel handle 11 to lock an adjustable shovel head in various angular positions.

U.S. Pat. No. 2,221,219 (Nelson), U.S. Pat. No. 1,741,004 (Wornstaff) and U.S. Pat. No. 1,261,859 (Seiter) show other shovels in which a linearly movable rod or wire which extends along a fixed-length handle is moved to lock and unlock a pivotable shovel head in various positions at the end of the handle. In Wornstaff the rod is actuated by a hand lever 17.

Accordingly, there exists a need for an effective and reliable mechanism which combines an adjustable-length extension rod with a squeezable handle and linkage for remotely controlling the positioning and locking and unlocking of a tool head which is mounted at one end of the rod, and, among other things, for a suitable handle mechanism that is able selectively operate such a linkage.

SUMMARY OF THE INVENTION

The present invention has solved the problems cited above, and is directed at a tool having a tool head which is configured to be in contact with a generally planar work surface, such as an applicator for plastering walls. An apparatus in accordance with the present invention comprises an adjustable-length extension rod, a tool head which is mounted to an end of the extension rod so as to be pivotable between a plurality of angular head positions, and a control means for controlling the angular position of the head from the handle end of the extension rod, this control means including a linkage which is configured to automatically adjust its length when the length of the extension rod is adjusted.

The control means preferably comprises a manually compressible handle, a clutch operated by the handle, and a tensioned elongate, flexible connecting member which is engaged by the clutch end which extends along the rod to the head. Manipulation of the handle acts through the clutch to displace the connecting member longitudinally between first and second positions in which the head is caused to be, respectively, locked or unlocked. When an operator leaves the handle uncompressed, the clutch is disengaged from the connecting member, which is spring biased to the unlocked position so that the head is unlocked and therefore movable between different angular positions. But when the operator compresses the handle, the clutch engages the connecting member and moves it to the locked position, so that the head is locked in a selected angular position. Preferably, the connecting member comprises a coilable tape having at a coiled portion and a straight portion, with the coiled portion being mounted to the control handle end of the rod, and the end of the straight portion of the tape being operatively connected to the tool head for actuating a locking mechanism which holds the tool head in a selected angular position.

The locking mechanism may preferably comprise a locking surface mounted to the tool head so as to rotate therewith about a pivot axis. A locking pin is mounted to the extension rod for movement in response to displacement of the elongate connecting member between its first and second positions, so that in the first position the locking pin is disengaged from the locking surface, and in the second position the locking pin is frictionally engaged with the locking surface to prevent rotation of the tool head.

A method of the present invention is directed at enabling manipulation of the handle, acting through the clutch and the connecting member, to control positioning of the tool head.

BRIEF DESCRIPTION OF THE DRAWINGS

FIG. 1 is a perspective view of a plaster applying and spreading tool which embodies the present invention, this being shown in an upright position, with an extended position of the extension rod being shown in phantom lines;

FIG. 2 is a side view of the tool of FIG 1;

FIG. 3 is another side view of the tool of FIGS. 1-2, with the tool head shown positioned flat against a drywall surface;

FIGS. 4A and 4B are views of lengthwise sections of the tool of FIGS. 1-3, showing the grip handle of the tool in the released position so that the tool head is unlocked and free to pivot on the end of the extension rod, FIG. 4A being taken along line A—A in FIG. 1 and FIG. 4B being taken along line B—B in FIG. 1, these being axially rotated 90° relative to one another for ease of presentation;

FIGS. 6A and 6B are views of the tool of FIGS. 1-3, similar to the views of FIGS. 4A-4B, showing the grip handle in a fully compressed position in which the actuating tape has been engaged by the clutch and moved to the locked position, so that a rocker portion of the locking mechanism has forced the locking pin into engagement with the locking plate of the tool head;

FIG. 9 is a section view similar to the view of FIG. 8, showing the legs of the toggle-joint spread so that the locking mechanism is in its locked position;

FIG. 10 is an end view of the head portion of the tool shown in FIGS. 8-9, taken along line 10—10;

FIG. 11 is another end view of the head portion of the tool shown in FIGS. 8-9, this being taken along line 11—11:

FIG. 12 is a view of a lengthwise section of a portion of a tool incorporating an embodiment the present invention in which the telescoping tubes are selectively locked together by a nylon cam lock;

FIG. 13 is a view of a transverse section of the tool of FIG. 12, taken along line 13—13, showing the cam lock in an unlocked position; and FIG. 14 is a view similar to that of FIG. 13, showing the cam lock in a locked position.

Figure 4A:
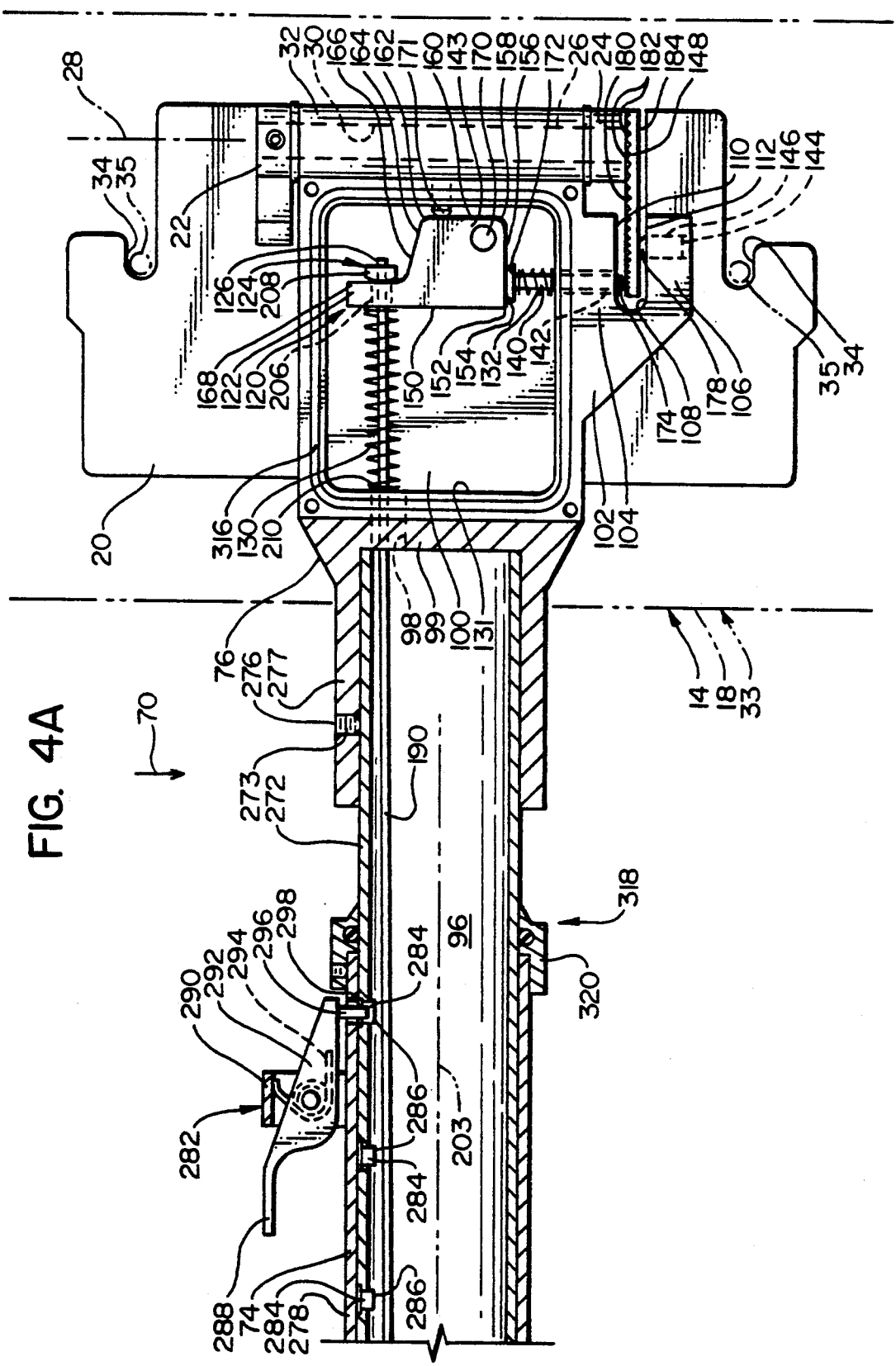

DESCRIPTION OF THE PREFERRED EMBODIMENT a. Overview

FIG. 1 shows an elongated plaster applying and spreading tool 10 incorporating the present invention, which comprises generally a telescoping rod portion 12 having a head end 14 and a handle end 16. A tool head 18 is pivotably mounted at head end 14. Tool 10 is configured to be gripped by a manual operator with one hand on the rod portion 12 and the other on the handle end 16, so that the operator can apply plaster to a wall from tool head 18.

As shown in FIGS. 1-3, tool head 18 comprises an attachment plate 20 having a pair of rearwardly projecting parallel flanges 22 and 24 near its upper edge. A pivot shaft 26 extends through flanges 22, 24 and an accommodating bore 30 in a generally cylindrical barrel 32 which is positioned between the flanges, barrel 32 being fixedly attached to rod portion 12. A plaster applying tool 33, which may, for example, be a well-known plaster-applying accessory marketed under the trade name "Flat Finisher" by Columbia Taping Tools, of Surrey, British Columbia, Canada, is detachably mounted to attachment plate 20. As is shown in FIG. 4A, attachment plate 20 is provided with a pair of open-ended slots 34 which receive a corresponding pair of threaded studs 35 which project rearwardly from a flapper 46 at the back of plaster applying tool 33, these being secured in slots 34 by means of wing nuts 61 (See FIG. 1).

Conventional flat finisher 33 is used to apply plaster 36 or other pasty or fluid materials to a planar drywall surface 38, so as to cover a paper tape (not shown) that is commonly used to cover seams in the drywall, and to prepare surface 38 for painting. Flat finisher 33 comprises generally a box 40 having four side faces 42, a rear face 50, and a wall engaging front face 44. An inwardly collapsible flapper 46 is pivotally attached to rear face 50 by a hinge 48, and a pair of springs 52 bias the flapper to the outward position shown in FIG. 1, these having first ends attached to the flapper at lugs 54 which are adjacent the edge of the flapper which is opposite hinge 48, and second ends which ar attached to the rear face of box 40 at lugs 56 which are adjacent the hinge. When flapper 46 is pivoted inwardly towards the drywall surface 38, it applies pressure to a load of plaster within box 40, causing the plaster to be discharged through a discharging slot 60 (see FIG. 2) in the wall engaging face 44; since attachment plate 20 is mounted directly to flapper 46, this inward rotation can be achieved by applying pressure on flapper 46 using rod portion 12. The plaster load is injected into flat finisher 33 through a filler valve 58 at the top of box 40.

Conventional flat finisher 33 is also fitted with a pair of wheels 62, and a blade 64 which is positioned on face 44 above the plaster discharge slot. In operation, the wheels 62 are positioned on the drywall surface 38 so that wall engaging face 44 lies flat against surface 38 (see FIG. 3), and then the flat finisher is moved downwardly along surface 38 while inward pressure is applied to flapper 46, so that the plaster 36 is squeezed out through discharge slot 60 and spread on drywall surface 38 by blade 64.

Flat finisher 33 is mounted at one end of rod portion 12, which, as is shown in FIGS. 4A–4B, comprises generally a telescoping tubular portion 74 having a handle housing 72 attached to its lower end and a head housing 76 attached to its upper end. It should be noted at this point that the terms "up", "down", "upward", "downward", and the like are used herein with reference to the tool of the present invention having its rod portion 12 aligned in a vertical direction, with the tool head 18 positioned at its upper end.

A series of interconnected chambers are formed within rod portion 12, and these include (a) a generally circular chamber 80 in handle housing 72, which is connected via passageway 82 to (b) a generally rectangular chamber 84, which is also formed in the handle housing and which has a first and second sidewalls 86 and 90, and lower and upper walls 88, and 92. Chamber 84 is connected, in turn, through a passageway 94 in the end wall 95 of housing 72 to (c) a cylindrical chamber 96 which extends through tubular portion 74, this being connected via slot 98 in the lower wall 99 of head housing 76 to (d) a generally rectangular lock chamber 100 enclosed within the head housing. For reasons which will become apparent from the following description, slot 98 is formed with sufficient width to permit the connecting member to move transversely therein.

Barrel 32 is mounted transversely to the upper end of head housing 76, and accommodates the pivot shaft 26. Head housing 76 also includes a laterally projecting thumb member 102 which has inner and outer portion 104 and 106 which define a U-shaped opening 108 having upper and lower walls 110 and 112. Furthermore, head housing 76 encloses a locking mechanism 120, which includes a rocker member 122 which is pivotable between a clockwise position and a counter-clockwise position. When the rocker is in its clockwise position (see FIG. 4A), the locking mechanism is unlocked so as to permit tool head 18 to pivot freely about shaft 26, and when rocker 122 is in its counter-clockwise position (see FIG. 6A), the locking mechanism is locked so as to hold the tool head in a selected angular position relative to rod portion 12.

The pivoting of rocker 122 between its clockwise and counterclockwise positions is controlled by control linkage 124, which comprises a first, straight portion and a flexible, coiled portion. As shown in FIG. 4A, one end of the straight portion of the control linkage is connected to a lateral extension of rocker 122 at first linkage terminus 126; from here, linkage 124 extends downwardly through the interior of rod portion 12 to circular chamber 80. Within chamber 80, the coiled portion of linkage 124 is anchored to the other linkage terminus 128. Control linkage 124 is normally urged upwardly by a first coil spring 130, which is positioned intermediate the lateral extension of rocker 122 and the lower wall 131 of lock chamber 100 s that it biases rocker 122 in a clockwise direction about a pivot pin 170. The diameter of coil spring 130 is sized to prevent it from slipping through slot 98. Rocker 122 is additionally urged in the clockwise direction about pivot pin 170 by a second coil spring 132, which surrounds locking pin 140 and is positioned intermediate rocker 122 and right side wall 135 of lock chamber 100 so that the head of the pin pushes laterally against rocker 122 below pivot pin 170. Springs 130 and 132 thus act in concert to bias rocker 122 towards its clockwise position to keep the tool head 18 unlocked and freely pivotable on the end of rod portion 12.

Handle 134 is provided for remote manual operation of locking mechanism 120. As shown in FIG. 4B, handle 134 is mounted by a pivot pin 136 to handle housing 72, and is configured so that it can he squeezed by the hand o: an operator. The handle operates the clutch-drive mechanism 138, which is housed within rectangular chamber 84, and when the handle is released so that the clutch drive mechanism is in the disengaged position shown in FIG. 4B, this allows the control linkage 124 to move freely through the mechanism and permits springs 130 and 132 to force rocker 122 to its clockwise position. When handle 134 is squeezed by the operator, however, the clutch drive mechanism 138 engages control linkage 124 and pulls it downwardly, overcoming the bias of springs 130 and 132 and pivoting rocker 122 to the counterclockwise position shown in FIG. 6A so as to lock the tool head 18 in a selected angular position.

As noted above, rod portion 12 is telescopable to assume various selected lengths: as this is done, control linkage 124 automatically adjusts its own length within rod portion 12, the actuating tape being paid out from and retracted into the coiled portion in handle 72 as necessary to maintain a taut control linkage between the clutch-drive mechanism 138 and the locking mechanism 120.

b. Detailed Description

The components which have been described above in overview will now be described individually in greater detail.

Locking mechanism 120, as shown in FIGS. 4A and 6A, comprises a locking pin 140 which is slideably mounted in a cooperating bore 142 which penetrates the inner portion 104 of thumb member 102 so that the outer end of the pin protrudes into the U-shaped slot 108. A set screw 144 is mounted in a threaded bore 146 in the lower part 106 of thumb portion 102 so that the setscrew protrudes into U-shaped area 108 generally opposite, but offset from, locking pin 140, the inner ends of the pin and screw being spaced apart laterally so that a gap is formed between them. A flat, serrated quadrant plate 148 (seen in perspective in FIG. 1), which extends perpendicularly from the back of attachment plate 20, is positioned in U-shaped slot 108 between the ends of the locking pin and set screw 144. Quadrant plate 148 rotates together with attachment plate 20 when the latter is pivoted about axis 28 to various angular positions. Quadrant plate 148 is provided with a series of radially extending serrations 182 on one side 180, which are configured to be frictionally engaged by the protruding end of locking pin 140. The opposite face 184 of quadrant plate 148 is smooth, so that it slides over the end of set screw 144.

The inner end of pin 140 abuts rocker 122. The rocker is a generally flat member having a long edge 150 which extends perpendicularly to linkage 124, and a camming edge 156 which extends at a right angle to edge 150 from corner 152. A shorter edge 160 extends parallel to long edge 150, and the left-hand portion 164 of this edge curves or tapers inwardly toward long edge 150 from corner 162 to form a laterally extending neck 168. Near its upper right corner 158, rocker 122 is mounted by pivot pin 170 to lock chamber 100 The rounded head 172 of pin 140 is engaged by the camming edge 156 of the rocker at a location 154 which is below pivot pin 170, and spring 132 urges the pin 140 upwardly against camming edge 156 tending to bias the rocker in the clockwise direction. A small set screw 171 installed in the upper wall of the lock chamber limits the extreme clockwise position of the rocker.

Figure 5:
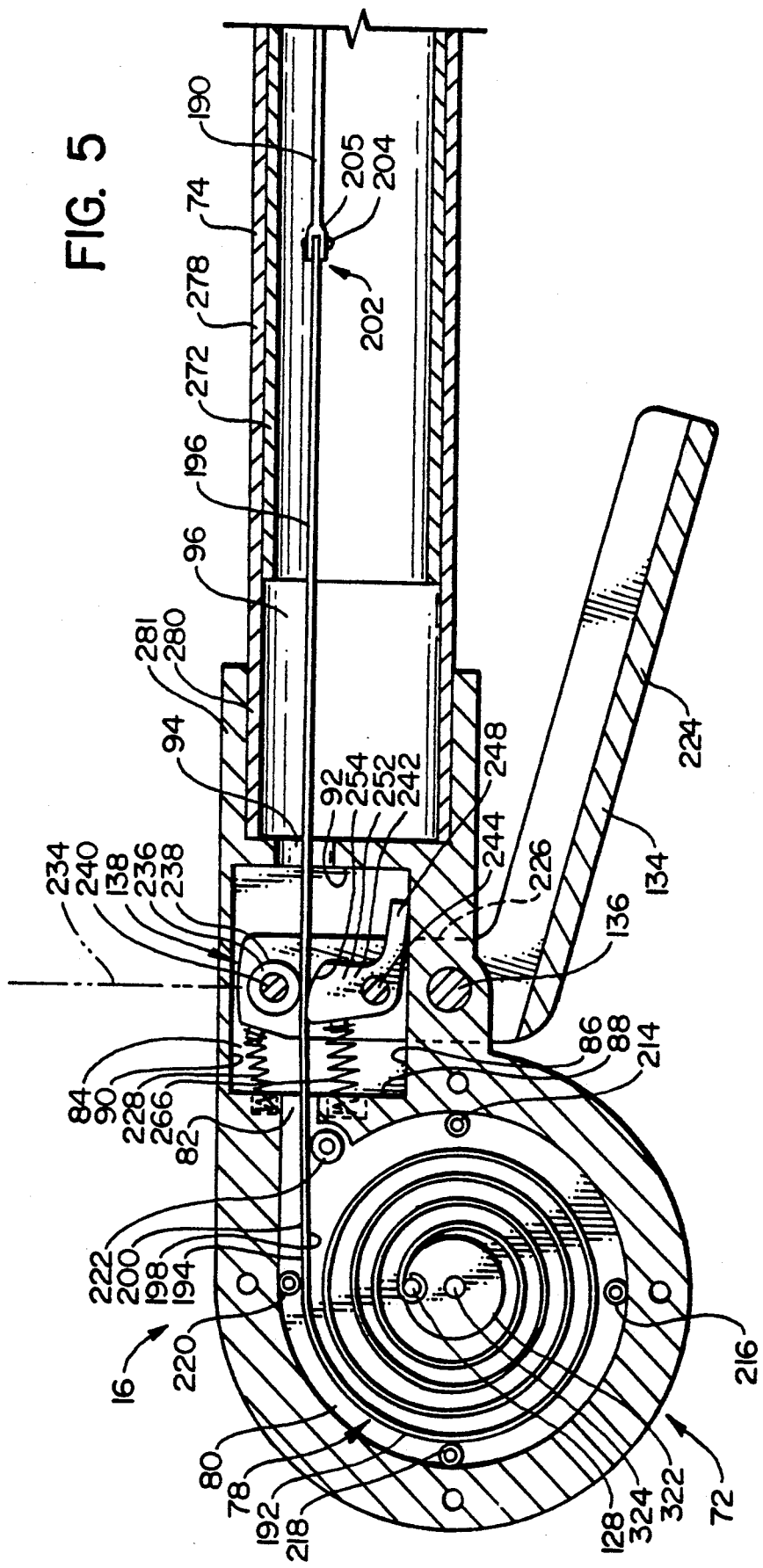
FIG. 5 is a view of the tool of FIGS. 1-3, similar to the view of FIG. 4B, showing the grip handle in a partially compressed position in which the clutch is at the point of commencing engagement of the internal connecting tape.

The laterally extending neck of rocker 122 is attached to control linkage 124, which, as is shown in FIGS. 4-6, comprises a rigid linear rod 190 and a flexible, partially coiled connecting tape 188. Tape 188 formed of a thin, flexible material which resists stretching under tension, such as, for example, steel tape. Tape 188 is anchored to handle portion 72 at lower linkage terminus 128. From here, the coiled portion 192 of the tape unbends at location 194 to form straight portion 196 which extends through passageway 82, rectangular chamber 84, and passageway 94, and into cylindrical hollow 96, where it is attached to rigid rod 190 at lateral pivot joint 202. Pivot joint 202 comprises a yoke 205 which is formed on the lower end of rod 190; the upper end of the flat connecting tape is received in the lateral slot of the yoke and is retained therein by a rivet 204 so that the tape and rod can pivot laterally relative to one another. Rod 190 extends from pivot joint 202 through cylindrical chamber 96 and slot 98, and into lock chamber 100, where the upper end of the rod 190 is inserted through a hole 206 in the extending neck of rocker 122 and is connected to a self-locking nut 208 which prevents the rod from being withdrawn through the hole. Spring 130 surrounds the upper end of rod 190, and is seated at one end against the lower wall of the lock chamber and at the other end against the long edge 150 of rocker 122.

Figure 6B:
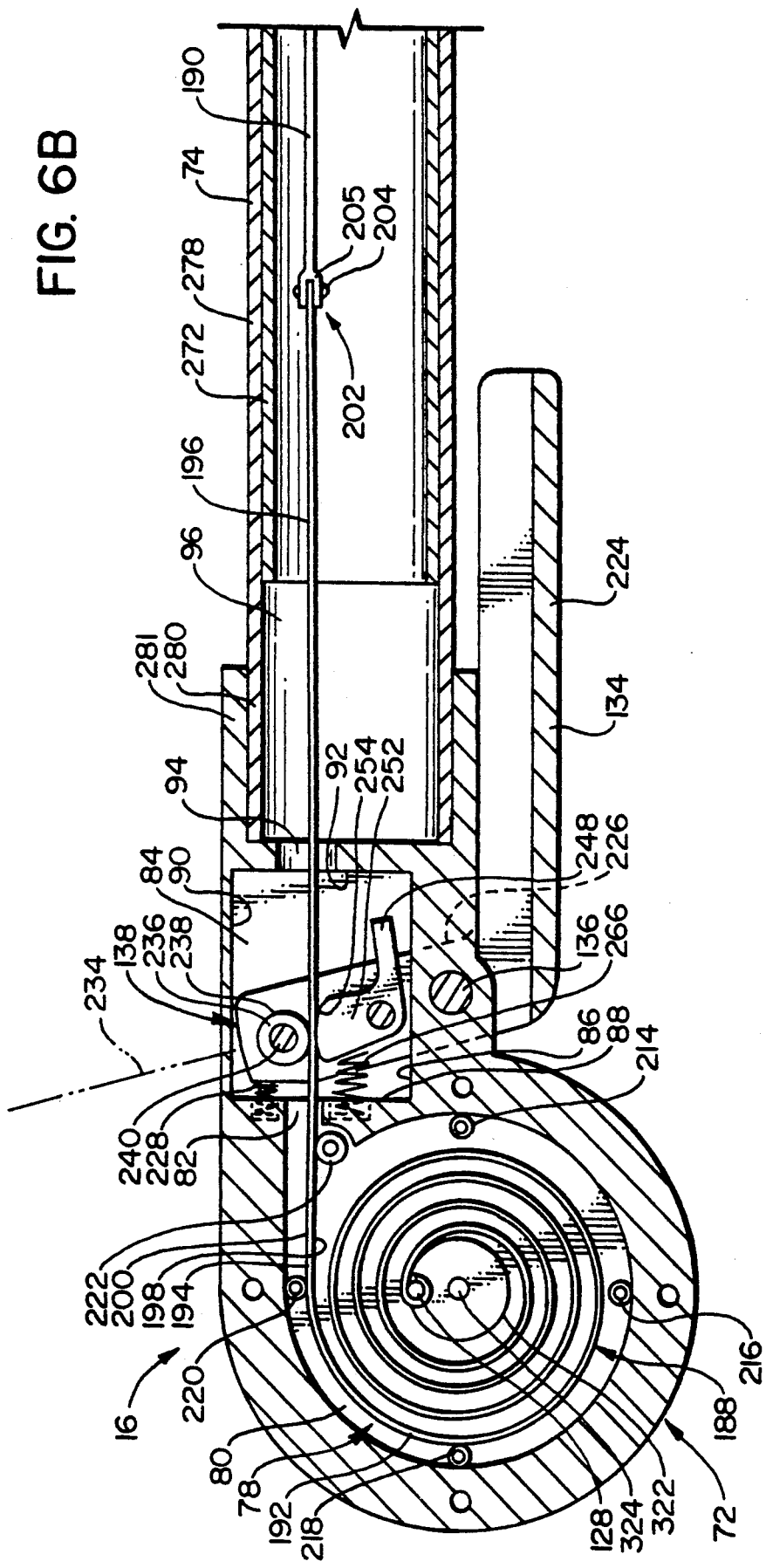

It should be noted at this point that, as previously mentioned, the planes of FIGS. 4A and 4B, and 6A and 6B, are rotated 90° relative to one another. For example, the plane of FIG. 6B is indicated in FIG. 6A by phantom line 203.

The coiled tape portion 192 acts as a spring in opposition to springs 130 and 132 so as to hold the straight portion of the tape and rod 190 under tension, although the combined force of springs 130 and 132 is sufficient to retain the rocker in its clockwise, unlocked position. As shown in FIG. 4B, four small rollers 214, 216, 218, and 220 are positioned around the periphery of circular chamber 80 to prevent the coiled tape from rubbing against the inside wall of the chamber, and to direct the path of the tape toward passageway 82, a fifth roller being provided proximate the mouth of passageway 82 to guide the tape into rectangular clutch chamber 84.

Figure 7:
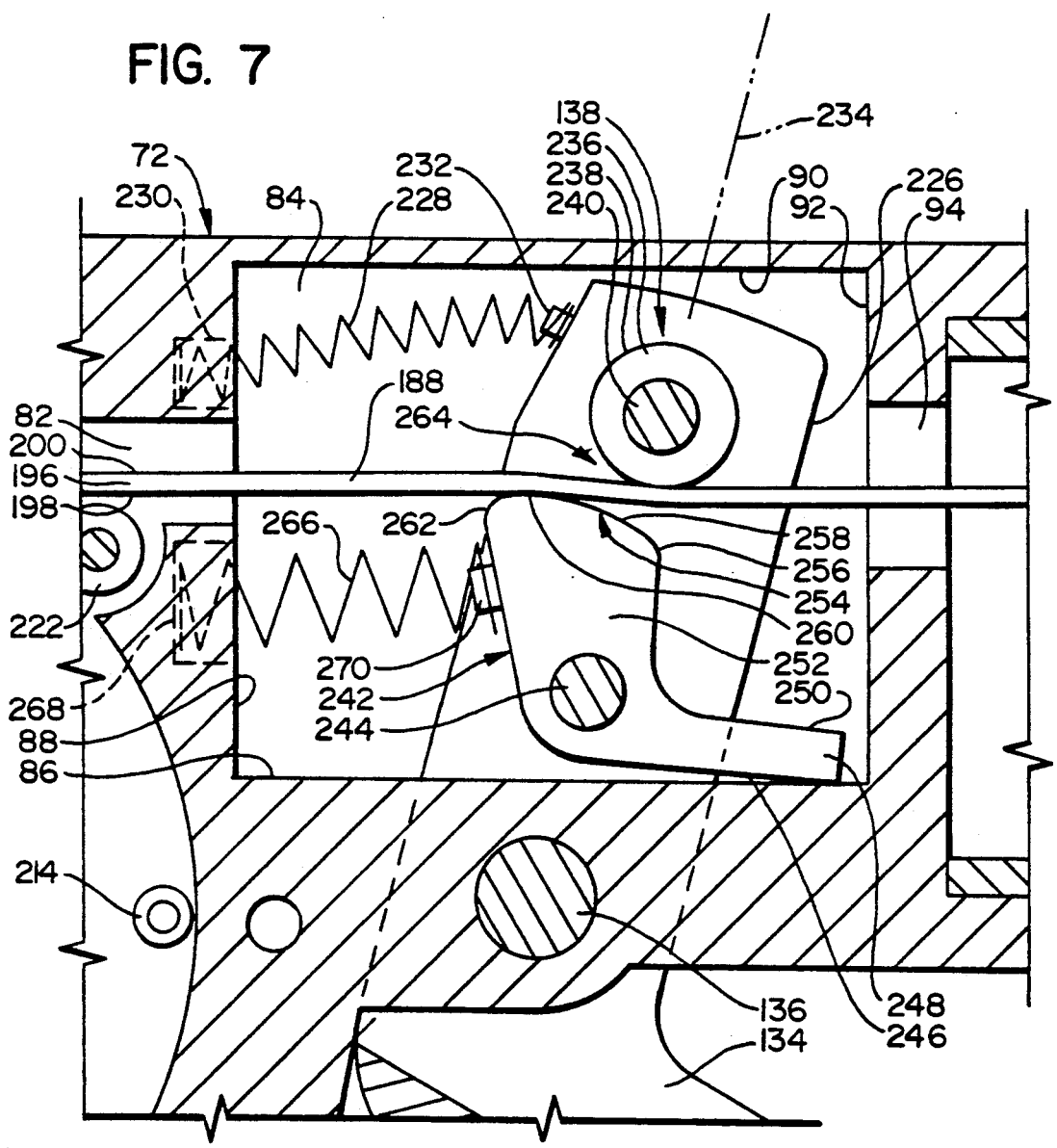
FIG. 7 is a view similar to that of FIG. 4B, this being enlarged to show details of the clutch mechanism of the tool of FIGS. 1-6.

The clutch-drive mechanism in chamber 84 is operated by handle 134, which, as is shown in FIG. 4B, comprises generally a relatively long first leg portion 224, which is configured to be compressed against handle portion 72 by the fingers of the operator's hand, and a second leg portion 226, which is joined to the first at an obtuse angle (e.g., 110°). As is shown in detail in the enlarged view of FIG. 7, the smaller second leg portion is biased upwardly (clockwise) about pivot pin 136 by a handle spring 228 which is seated a& one end in a bore 230 formed in the lower wall 88 of chamber 84, and at the other end around a pin 232 which is proximate the end of second leg portion 226. The longitudinal axis 234 of second leg portion 226 pivots in a counterclockwise direction as handle 134 moves between an open position, as shown in FIG. 48, to a closed position, as shown in FIG. 6B.

The clutch-drive mechanism itself comprises a relatively large roller 236 which is mounted on a laterally extending axle pin 240 near the end of second leg portion 226, roller 236 having a roller surface 238 which is configured to engage the outer surface 200 of straight tape portion 196. Clutch-drive mechanism 138 also comprises a clutch or dog 242 which is pivotably mounted to the handle slightly above the side wall 86 of chamber 84 on a pivot pin 244, which is connected to the second leg portion of the handle on a line between pivot pin 136 and roller axle pin 240.

Pivotable dog 242 has a relatively narrow first leg portion 248, and a flared second leg portion 252 which extends at an obtuse angle (e.g., 110°) from the first leg and which has a curved working end 254. As shown in FIGS. 4B and 5, first leg 248 abuts the side wall 86 of chamber 84 when handle 134 is in the released position. A positioning spring 266 which is seated in a bore 268 in the lower wall 88 of chamber 84 and against the second leg of dog 242 around a pin 270 tends to bias the dog in a clockwise direction about pivot pin 244. The working end 254 of dog 242 defines a curved, knurled surface which extends from an upper shoulder 256 towards an outwardly-bowed tape engaging spot 260, and then back inwardly slightly to a lower shoulder 262, lower shoulder 262 extending appreciably further outwardly than upper shoulder 256, and tape engaging spot 260 being formed substantially closer to the lower shoulder than the upper shoulder. Tape engaging spot 260 is configured to remain continuously in contact with the inner surface 198 of tape portion 196, whether the clutch is in the engaged or disengaged condition, and, together with roller surface 238, defines a tape receiving area 264.

When released as shown in FIG. 4B, clockwise movement of handle 134 is limited primarily by the abutment of roller 236 against tape 196. In this position, the first leg 248 of pivotable dog 242 reacts against side wall 86 to rotate dog 242 in a counterclockwise direction, which moves the tape engaging spot 260 away from and out of alignment with roller surface 238, which, in essence, widens or opens tape receiving area 264. Since tape engaging spot 260 is thus spaced apart from and unopposed by roller surface 238, it is unable to exert sufficient frictional force on the tape to resist the force of springs 130 and 132 on the control linkage 124, which consequently bias rocker 122 to the unlocked position so that tool head 18 can pivot freely.

Since the tape can slide freely through the clutch mechanism when handle 134 is released, this also allows the length of rod portion 12 to be adjusted. As shown in FIGS. 4A-48, the tubular portion 74 of the rod comprises telescoping inner and outer tubes 272 and 278, inner tube being mounted to the collar 277 of head housing 76 by setscrew 273, and outer tube 278 being mounted to the collar 281 of handle housing 72. Tubes 272 and 278 can be telescoped to adjust the length of rod portion 12, and are locked at selected lengths by means of a retaining mechanism 282 (see FIGS. 4A, 6A), which engages a plurality of equally spaced retaining holes 284 which are formed along the length of inner tube 272. The retaining mechanism comprises a bracket 290, which is mounted proximate the upper end of outer tube 278, and which carries a pivoting lever 292 having an upper end which is biased inwardly by a lever spring 294 which is retained in bracket 290. Lever 292 has a thumb-operable portion 288 on its outwardly-biased lower end, and a depending tooth 296 on its upper end, tooth 296 being configured to pass through an accommodating bore 298 in outer tube 278 and engage a selected one of the retaining holes 284 in the inner tube, the inner end of tooth 296 being received in a cup 286 which is mounted in the retaining hole. To adjust the length of rod portion 12, the operator merely depresses the thumb portion of lever 292 to withdraw tooth 296 from the retaining hole 284. This unlocks tubes 272 and 278 so that these can be telescoped (as indicated by the phantom lines in FIG. 1) to form a longer rod length, at which length another retaining hole 284 is brought into alignment with outer bore 298. Thumb portion 288 is then released so that tooth 296 slips into holes 298 and 284, re-locking tubes 272 and 278.

An economical alternative to the just-described retaining mechanism may be a conventional nylon cam-lock device mounted within the telescoping tubes. FIG. 12 shows a cam-lock 410 having the narrow end 412 of its tubular barrel portion 414 fixed in the end of inner tube 272 by an interference fit and punched locking teets 416. The large end 418 of the barrel portion extends radially beyond the end of the inner tube so that an annular cam sleeve 420 which is fitted around the large end of the barrel frictionally abuts the inner wall 421 of the outer tube 278. As shown in FIG. 13, the inside of cam sleeve 420 is provided with camming ramps 422 which are in sliding engagement with underlying camming ramps 424 on the barrel. The cam sleeve is ordinarily biased radially inwardly to the position shown in FIG. 13; however, in response to relative rotation of the sleeve and barrel, the camming ramps force the cam sleeve outwardly to the position shown in FIG. 14. As this is done, the cam sleeve moves radially outwardly in the direction indicated by arrows 426 in FIG. 12 so as to frictionally engage the inner wall of outer tube 278, locking the telescoping tubes in place relative to one another. Accordingly, the operator can simply twist the tubes in a first direction to unlock the cam-lock device 410 so that the tubes can be telescoped, and the tubes are then rotated in the opposite direction to lock them together at the selected length.

During the rod-lengthening step, straight tape portion 196, being free to move through the tape receiving area 264 (because the handle 134 is in its open position), automatically lengthens, additional tape being pulled from coiled tape portion 192 to supply the needed extra length for control linkage 124. To shorten the rod, handle 134 remains in its open position and tubes 272 and 274 are unlocked, moved together, and relocked at the desired shorter length, excess tape being automatically retracted into circular chamber 80 by coiled tape portion 192 so as to shorten control linkage 124.

Assuming now that the length of the rod portion 12 is satisfactory, and that the application of plaster to the drywall is to begin, box 40 of the flat finisher 33 is charged with a quantity of plaster, and the operator positions face 44 of the flat finisher more or less flush against the drywall surface. The operator then adjusts the angular position of rod portion 12 relative to the attachment plate 20, until a desired tool angle 300 (i.e., the angle between wall engaging face 44 and rod portion 12) is obtained. Once this desired tool angle has been achieved, the operator simply squeezes and holds handle 134 closed to lock the tool head in position.

As handle 134 is squeezed, as is shown in FIG. 5, the handle leg axis 234 is pivoted counter-clockwise, and the dog positioning spring 266 and the abutment of leg 248 against wall 86 hold dog 242 in position as the surface 238 of roller 236 moves into opposing alignment with tape engaging spot 260 so as to narrow tape receiving area 264. As handle 134 is squeezed further closed, as shown in FIG. 6B, dog 242 remains in position with its knurled tape engaging spot in contact with the inner surface 198 of tape 196, while roller surface 238 presses against the other side 200 of the tape. This places tape 196 in frictional engagement with the working surface of dog 242, so that during further movement of handle 134 to the fully closed position (FIG. 6B), the tape portion which is frictionally engaged between roller 236 and dog 242 is pulled downwardly as the axis 234 of handle 134 continues to pivot in a counterclockwise direction. This moves control linkage 124 downwardly, overcoming the force of springs 130 and 132 so that rocker 122 pivots counterclockwise, causing the camming edge 156 of the rocker to depress the pin 140. The end 174 of pin 140 moves into frictional engagement with the serrated surface of quadrant plate 148, so that the tool head 18 is locked in the selected angular position so long as squeezing pressure on the handle is maintained by the operator. The flat finisher 33 is then used in the conventional manner to discharge and to smooth a quantity of plaster upon the drywall surface.

When the person desires to change the angle of tool head 18 relative to the extension rod, the handle 134 is simply released so that its spring causes it to open. As handle 134 moves to the open position, the first leg 248 of dog 242 moves into abutment with wall 86 (see FIG. 5), so that further clockwise rotation of the handle 134 causes roller 236 and the working surface of the dog to move apart, t hereby opening up tape receiving area 264 and allowing straight tape portion 196 to move freely therethrough again. This permits springs 130 and 132 to unlock tool head 18 so hat it can be pivoted to whatever new angular position is desired.

As the straight tape portion 196 is worked linearly between the locked and unlocked positions by the pivoting motion of handle 134, bending of the tape, which might otherwise fatigue it or damage its operation, is avoided due to the rounded contours of the working faces 238 and 254 of the clutch roller and dog These are configured so that the tape is in tangential contact with the roller and dog throughout the stroke, with the result that the knurled working surface 254 of dog 242 in essence "rolls" to a limited extent over the inner surface of the tape. The outwardly extending lower shoulder 258 of working surface 260, however, is configured to prevent it from rolling or pivoting upwardly past roller 236.

Preferably pin 140 clamps against quadrant plate 148 near the end of its stroke, and, as pin end 174 wears down, this may be ensured by adjusting the nut that fastens the end of rod 190 to rocker 122; since the nut 208 is preferably a self-locking nut, it will retain its adjustment once set. Similarly, setscrew 144, against which pin 140 vises plate 148, is adjustable for wear, however, this should be kept sufficiently loose that quadrant plate 148 slides freely over screw end 178. In order to enhance the frictional engagement of quadrant plate 148, the end 174 of locking pin 140 may be formed with a point.

Let us recapitulate several major features of the present invention 10 which have been described so far. First, when the rod portion 12 is telescoped, the control linkage 124, which provides control of tool head 18 from handle end 16, automatically adjusts its own length to compensate for the changed length of the rod portion. With the locking portion disengaged, the tool head is freely pivotable on the end of rod portion 12 so that it can readily assume a suitable angular position. The handle 134 is then simply squeezed to lock the tool head 18 in the desired angular position, affording the operator accurate control of the tool head. When squeezing the handle, the hand is also conveniently positioned to support the entire assembly, thus helping to alleviate fatigue.

Figure 8:
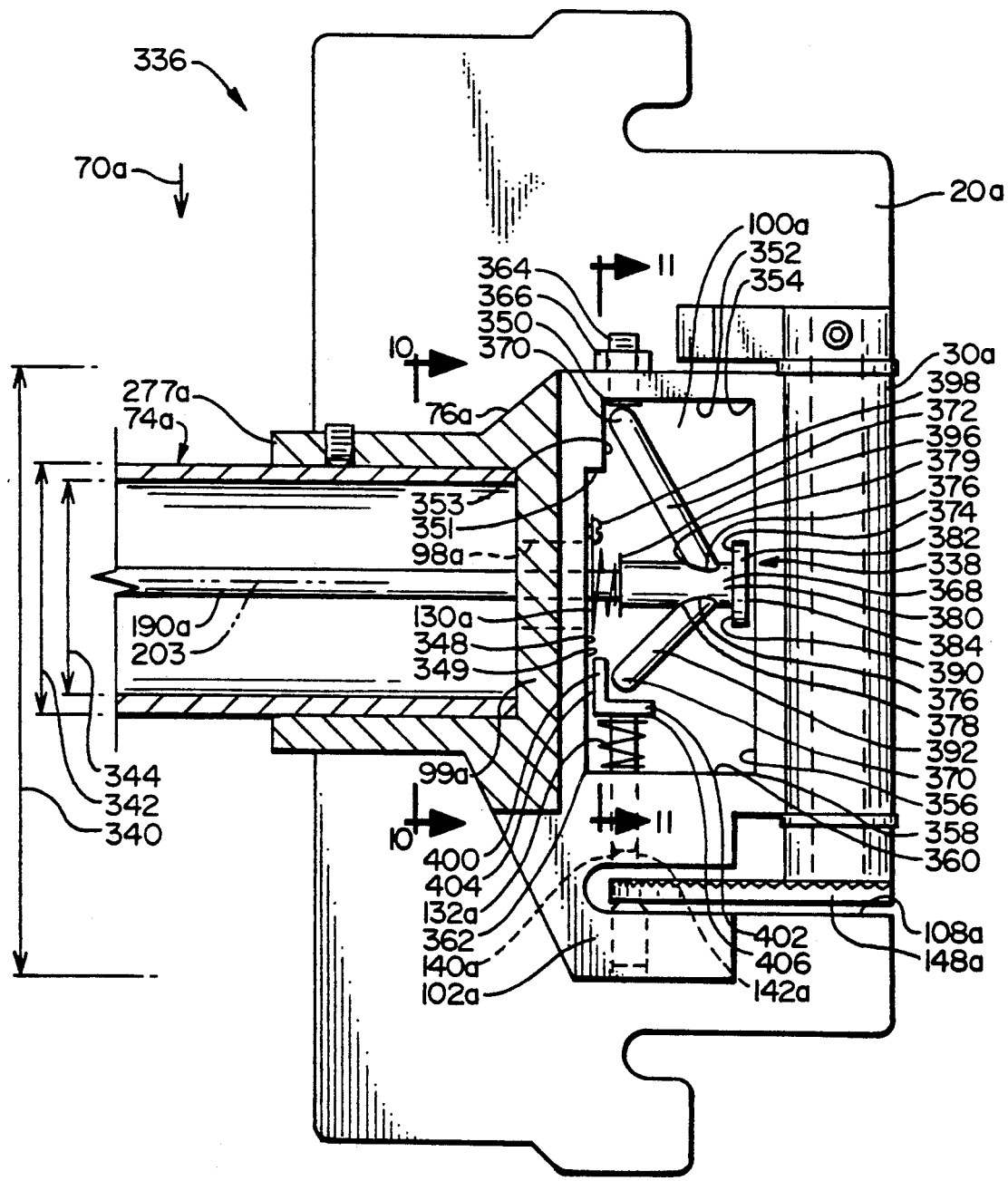
FIG. 8 is a view of a lengthwise section of the head end of a second embodiment of tool incorporating the present invention, similar to the view of FIG. 4A, in this embodiment the locking mechanism being a toggle-joint assembly having first and second spreadable legs, this being shown in its unlocked position.

FIG. 8 shows a second embodiment of the present invention, wherein components which are like those of the first embodiment have the same numerical designations as before, but with the suffix "a".

The second embodiment illustrates two principal variations from the first embodiment, (1) The rocker-pin combination (143) of the locking mechanism (120) of the first embodiment is replaced in the second embodiment by a toggle-joint arrangement 338; and (2) the overall length of the head housing 76a, including the mounting collar 277a, is shortened as compared to that of the first embodiment, so that a greater portion of the total length of extension rod 12a can be devoted to telescoping length adjustment. In substantially all other major respects the structure of the second embodiment is similar or identical to that shown for the first.

As is shown in FIGS. 8 and 9, rectangular lock chamber 100a has four straight interior walls 348, 352, 356 and 360. For reasons which will become apparent from the following description, a step or ledge 353 is formed at one side of the lower wall 348. Consistent with the shorter length of the head housing 76a, lock chamber 100a is shorter than that of the first embodiment (about one-third the length). The slot 98a which penetrates the wall 99a between lock chamber 100 and cylindrical chamber 96a (see FIG. 10) is relatively tall and is centered with respect to bisectional plane 203; the size and position this slot allow rod 190a to shift transversely relative to plane 203, as will be explained below. As in the first embodiment, a pivoting connector (202a) joins the straight tape portion (188a) to the rod 190a to permit the rod to pivot transversely at the connector.

Lock chamber 100a is relatively shallow, as shown in the end view of FIG. 11, this depth being only slightly greater than the thickness of the toggle-joint assembly 338 which is contained within the chamber. Toggle-joint assembly 338 (see FIGS. 8 and 11) comprises a central T-shaped knee shaft 380 which is fixedly attached to the end of the rod 190a, and a relatively long first arm 372 and a relatively short second arm 392, each of these having identically shaped circular cut-outs 376 at their inner ends 378 which fit closely about the cylindrical surface of the knee shaft. Knee shaft 380 is provided with a rectangular end plate 382 having a lower face 390, against which the inner ends 378 of arms 372 and 392 react. The top end face 384 of the knee shaft is configured to serve as a stop which abuts the top wall of the lock chamber when the mechanism is in the released condition.

As an alternative to arms having this "free floating" configuration, arms 372 and 392 could be pivotably attached to the top end of the shaft by suitable pivoting attachments, such as pins or pintels. The outer ends 370 of the arms 372 and 392 are rounded, and these abut, respectively, the head of pin 140 and the sidewall 352 of the lock chamber opposite that. The rounded head of pin 140 of the first embodiment is here replaced by an L-shaped head 402 which is integral with pin 140a. The inside corner of the L-shaped head provides a bearing location for the outer end of arm 392, with the outer surface of the L-shaped head being in sliding contact with the lower face 349 of chamber 100. A setscrew 364 protrudes into the interior of the lock chamber from wall 352 and bears against the outer end of arm 372 of the toggle-joint assembly; this setscrew provides an adjustment to compensate for wear of arms 372 and 392 and knee shaft 380, and is provided with a jam nut 366 by which it can be locked at a selected setting.

Spring 132a abuts the underside of L-shaped head 402 to bias pin 140a away from quadrant plate 148a. Spring 130a, in turn, surrounds the upper end of rod 190a between the lower wall of chamber 100a and the lower end of knee shaft 380 so as to bias rod 190a upwardly. Spring 130a is a conically-shaped spiral spring, with the base of the cone bearing against lower face 349 and the apex bearing against the lower end of the knee shaft. A ring clip 396 and screws 398 secure the base of spring 130a in place.

Springs 130a and 132a in combination urge the middle of toggle-joint 368 and the control linkage 124a upwardly, with tension being maintained on the linkage by the coiled tape position 192a. In this condition, toggle-joint 338 is said to be assuming its "released position." When, however, the clutch mechanism is actuated by squeezing handle 134a, control linkage 124a is pulled downwardly against the force of springs 130a and 132a, and, as is shown in FIG. 9, the knee shaft of the toggle-joint is pulled downwardly away from top wall 356 so that the toggle-joint assumes a "contracted" position, as will be described in greater detail below.

It is important that the toggle-joint 368 be kept under continual, laterally-directed compression, whether it is in the contracted or released position, in order to keep the free-floating arms 372 and 392 in proper alignment for operation. In particular, spring 132a needs to be sufficiently long that it exerts continuous force on the underside of the head of pin 140, so that when toggle-joint 338 is in the released position, this force is transmitted through upwardly-angled arm 392 against the side of knee shaft 380, and from the shaft through downwardly angled arm 372 to the corner between shelf 353 and the sidewall 352 of the lock chamber, to keep the arms wedged in position. Furthermore, the proximity of the front and back walls 408 of the chamber 100a to the sides of toggle-joint 338 helps guide arms 372 and 392 so that they remain in place in the mechanism.

In the released position, arms 372 and 392 converge at knee shaft 380 at a slightly obtuse angle (e.g., 105°), with the outer end of arm 392 being spaced laterally apart from the wall 360 of the chamber so that the outer end of pin 140a is retracted from the surface of quadrant plate 148a. When the operator squeezes handle 134, linkage 124a pulls the knee shaft 380 downwardly, and arms 372 and 392 spread apart, since their outer ends are constrained against downward movement by lower wall 351. Because the end of arm 372 abuts an unyielding sidewall 352, the outwardly directed force which is developed between the outer ends 370 of the arms acts against L-shaped head 402 to force pin 140a into locking engagement with quadrant plate 148a. Ledge 353 is configured to provide a height above the lower wall of chamber 100a which corresponds to the thickness of the lower side of the L-shaped head of pin 140a, so as to help ensure that the spreading force is delivered more or less axially to pin 140a. As pin 140a gives way in response to the endwise force of the spreading arms, knee shaft 380 shifts laterally in the direction of pin 140a, the corresponding movement of rod 190a being accommodated by the lateral extent of slot 98a and the hinge 202a in linkage 124a. Preferably, pin 140 is configured to come into contact with quadrant plate 148a near the end of the downward stroke of shaft 380, so that the operator is able to exert the clamping action near the end of the corresponding swing of handle 134a. The position of the outer end of the first arm 372 is adjustable inwardly or outwardly by means of the setscrew 364 to cause the pin 140a to reach the quadrant plate 148a earlier or later in the stroke of the handle.

As toggle-joint 338 is pulled to the contracted position in the manner just described, conical coil spring 138 compresses against the lower wall of the lock chamber; the helical configuration of this spring permits it to collapse virtually flat against the wall without any stacking of the coils. This, along with the configuration of the toggle-joint mechanism, permits the overall length of the head housing to be kept relatively short, with the result that a greater portion of the total length of the apparatus 10a can be devoted to the telescoping tubular members so as to achieve a greater range of length adjustments.

Whether in the first or second embodiment of the present invention, the entire exterior of the apparatus is preferably sealed so as to be liquid tight, or nearly so, in order to prevent any drywall compound or other semi-liquid or liquid working substance from penetrating into the interior of the device and interfering with the working of its internal mechanisms. In particular, the lock assembly 120 is covered by a plate 312 (see FIG. 1), which is sealed to the lock chamber by a generally rectangular seal 316 (see FIGS. 4A and 6A), such as a rubber seal or bead of caulking material, and the cover plate is tightly bolted to the head housing 76 by four bolts 314. Also, pin 140 is formed to have a close enough tolerance with hole 142 to prevent plaster from leaking therethrough into the interior of the head housing. At location 318, where the inner tube section 272 emerges from outer tube section 271, the outer tube section is fitted with an O-shaped scraper 320 (FIGS. 1-4A, 6A) which scrapes off any plaster which becomes deposited on the extended portion of the inner tube section. Furthermore, any plaster that attaches to the quadrant plate 148 is quickly scraped off by the sides of the U-shaped receiving area 108 as the quadrant plate pivots therethrough. Also, the exterior of the handle housing 72 is liquid tight.

Within handle housing 72 the end 126 of the coiled portion 192 of tape 188 is mounted to a winding wheel 322, which rotates about an axle 324. Winding wheel 322 is manually rotatable by means of an exterior Allen-type bolt 326 (see FIG. 2), so as to tighten the coiled tape portion. When the apparatus 10 is initially assembled, the tension on the connecting tape is adjusted as follows: rod 12 is extended to its fullest length; one end of connecting tape 192 is connected at joint 202 to rod 190, and the other is connected at terminus 128 to winding wheel 322: wheel 322 is then tightened nearly as far as can be done manually, and is then reversed one quarter of a turn and locked in place by means of a lock nut 328. This ensures that the connecting tape 188 will not prevent rod 12 from reaching its full extension, yet also ensures that connecting tape 188 and linkage 124 will be maintained under adequate tension during use.

It is to be understood that in lieu of the clutch drive mechanism 138, flexible tape 188, rod 190, and spring loaded rocker 122, various different linkage means which are capable of adjusting their length automatically when the tubular portion 74 is telescoped may be used for operatively connecting the handle 134 to the locking pin 140. Such a linkage could include, for instance, a rotating drive shaft which itself would be capable of telescoping Furthermore, it should be recognized that various other drywall accessories and tool attachments could be used at the working end of the apparatus of the present invention in place of the flat finisher 33, such as drywall corner rollers or corner finishers, or the tool head could be in the form of various other types of tools, such as grasping tools, trowels, or sgueegees, and so forth. While for drywall applications, the present invention 10 preferably collapses to minimum length of about three feet and extends to maximum length of about five feet, these lengths can be tailored as required for a particular type of tool head.

It is to be understood that these and various other modifications may be made to the invention as described herein without departing from the basic teachings of the invention.

What is claimed and desired to be secured by Letters patent of the United States is:

1. An extension rod assembly for manually positioning a tool head in contact with a work surface, said extension rod assembly comprising:
an elongate rod member having a longitudinal axis and first and second ends, said rod member being configured so that the length of said rod member is selectively adjustable:
a base member for attachment to said tool head;
pivot means rotatably interconnecting said base member and said first end of said rod member;
locking means having an unlocked position for permitting rotation of said base member about said pivot means and a locked position for preventing said rotation;
a handle member mounted to said second end of said rod member, said handle member being configured for manual selection of a first handle position and a second handle position; and
a control linkage for operatively interconnecting said handle member and said locking means so that said locking mechanism is moved to said unlocked position in response to selection of said first handle position and said locking mechanism is moved to said looked position in response to selection of said second handle position, said control linkage being configured to operatively interconnect said handle at said second end of said tool member to said locking means at said first end of said rod member at various positions to which said first and second ends of said rod member are moved relative to one another as said length of said rod member is selectively adjusted;
whereby in response to selection of said first handle position, said base member is freely pivotable relative to said axis of said rod member so as to bring a said tool head which is attached to said base plate into alignment with said work surface, and in response to selection of said second handle position, said base member is locked in an angular position relative to said rod member so as to retain said tool head which is attached to said base plate in alignment with said work surface as said extension rod assembly is manipulated by an operator.

2. The extension rod assembly of claim 1, wherein said control linkage comprises:

an elongate connecting member mounted to said rod member for linear movement, said connecting member having an end attached to said locking means so that said locking means moves to said unlocked position in response to linear displacement of said connecting member to a first position, and said locking member moves to said locked position in response to linear displacement of said connecting member to a second position; and clutch means operatively connected to said handle member for engaging said connecting member and linearly displacing said connecting member linearly to said second position in response to movement of said handle member from said first position to said second position.

3. The extension rod assembly of claim 2, wherein said connecting member is spring-biased for linear displacement to said first position in response to selection of said first handle position.

4. The extension rod assembly of claim 2, wherein said clutch means disengages from said connecting member in response to movement of said handle member from said second position to said first position, so that said elongate connecting member is free to be displaced linearly relative to said clutch means as said locking means to which said connecting member is attached is displaced linearly relative to said handle member as said length of said rod member is adjusted.

5. The extension rod assembly of claim 4, wherein said rod member comprises a first and second telescoping tubular members.

6. The extension rod assembly of claim 5, wherein said connecting member extends within a continuous hollow interior of said telescoping tubular members.

7. An extension rod assembly for manually positioning a tool head in contact with a work surface, said extension rod assembly comprising:

an elongate rod member having first and second tubular portions which are telescopically interconnected so that the length of said rod member is selectively adjustable by telescoping said first tubular portion relative to said second tubular portion;

a base member for attachment to said tool head;

pivot means rotatably interconnecting said base member and a first end of said elongate rod member;

locking means selectively movable to an unlocked position for permitting rotation of said base member about said pivot means and to a locked position for preventing said rotation;

an elongate connecting member having a first end connected to said locking means, said connecting member being mounted to said rod member for linear movement;

a handle member mounted to a second end of said rod member, said handle member being configured to pivot from a released handle position to a compressed handle position in response to an operator closing the grip of a hand on said handle member;

clutch means operatively connected to said handle member so that (a) said clutch means disengages from said elongate connecting member in response to selection of said released handle position so that said connecting member is free to move linearly past said clutch means as said locking means to which said end of said connecting member is attached is displaced linearly relative to said handle member as said tubular portions are telescoped to adjust said length of said rod member, and (b) said clutch means engages said connecting member in response to selection of said contracted handle position and displaces said connecting member linearly in a first direction so as to move said locking means from said unlocked position to said locked position; and means for biasing said connecting member linearly in a second direction so as to move said locking means to said unlocked position in response to disengagement of said connecting member from said clutch means.

8. The extension rod assembly of claim 7, wherein said connecting member comprises a flexible member having a straight portion configured to be engaged by said clutch means so as to transmit force in a linear direction and a coiled portion from which said flexible member uncoils so as to increase the length of said straight portion as said length of said rod member is selectively increased, and into which said flexible member coils so as to decrease said length of said straight portion as said length of said rod member is selectively decreased.

9. The extension rod assembly of claim 8, wherein said flexible member is a flexible tape.

10. The extension rod assembly of claim 9, wherein said flexible tape is a flexible steel tape.

11. The extension rod assembly of claim 9, further comprising a circular housing mounted to said second end of said rod portion for enclosing said coiled portion of said flexible tape.

12. The extension rod assembly of claim 9, wherein said pivotable handle member comprises:

a pivot portion pivotably mounted to said second end of said rod member;

an outer leg portion extending from said pivot portion and configured to be gripped by said hand of said operator; and an inner leg portion extending from said pivot portion athwart said straight portion of said flexible tape, said inner leg portion being attached to said clutch means so that said clutch means disengages from said flexible tape in response to pivoting of said handle member to said released position, and engages and linearly displaces said flexible tape in said first direction in response to pivoting of said handle member to said compressed position.

13. The extension rod assembly of claim 12, wherein said clutch means comprises:

a first engagement member fixedly mounted to said inner leg of said handle member so as to be positioned on a first side of said straight portion of said tape; and a second engagement member pivotably mounted to said inner leg of said handle member so as to be positioned on a second side of said straight portion of said tape, said second engagement member being configured to pivot into abutment against said first engagement member in response to an initial phase of pivoting movement of said handle member from said released position towards said compressed position so as to frictionally engage said flexible tape between said first and second engagement members.

14. The extension rod assembly of claim 13, wherein said clutch means linearly displaces said flexible tape which is gripped in said clutch means in said first direction, so as to move said locking means to said locked position, in response to a second phase of pivoting movement of said handle member from said released position towards said compressed position.

15. The extension rod assembly of claim 14, wherein said second abutment member comprises:
   a pivot portion pivotably mounted to said inner leg of said handle member;
   an engagement leg extending from said pivot portion towards said second side of said tape and having an outer surface configured to frictionally engage said second side of said tape; and
   an actuating leg extending from said pivot portion and configured to abut a fixed member attached to said rod member so as to pivot said outer surface of said engagement leg into abutment with said fixed member on said inner leg of said handle member in response to said initial phase of pivoting of said handle member.

16. The extension rod assembly of claim 8, wherein said locking means comprises:
   a locking plate mounted to said base member so as to pivot together with said base member about said pivot means;
   a locking pin mounted to said rod member for linear movement from a first position in which an outer end of said locking pin is out of engagement with said locking plate so as to permit said base member to pivot about said pivot means and a second position in which said outer end of said locking pin is in engagement with said locking plate so as to prevent said base member from pivoting about said pivot means; and
   means for displacing said locking pin from said first position to said second position in response to movement of said locking means by said connecting member from said unlocked position to said locked position.

17. The extension rod assembly of claim 16, wherein said means for displacing said locking pin comprises a rocker pivotably mounted to said first end of said rod member at a pivot point, said rocker being attached to said end of said connecting member so that said rocker pivots about said pivot point from a first position to a second position in response to said linear displacement of said connecting member in said first direction, said rocker having a cam surface configured to abut an inner end of said locking pin so as to displace said locking pin from said first position to said second position in response to said pivoting of said rocker from said first position to said second position.

18. The extension rod assembly of claim 16, wherein said means for displacing said locking pin comprises a toggle joint having a knee shaft attached to said connecting member and first and second arms which extend at an angle from said knee shaft and have outer ends which abut a fixed member attached to said rod portion so that an outwardly-directed endwise force is generated between said outer ends of said arms in response to said linear displacement of said connecting member in said first direction, said outer end of one said arm being configured to abut an inner end of said locking pin so that said outwardly-directed endwise force displaces said locking pin from said first position to said second position.

19. The extension rod assembly of claim 16, wherein said outer end of said locking pin in configured to frictionally engage said locking plate.

20. The extension rod assembly of claim 17, wherein said connecting member further comprises a rigid rod having a first end attached to said rocker and a second end attached to an end of said flexible member.

21. The extension rod assembly of claim 20, wherein said flexible member is a steel tape.

22. The extension rod assembly of claim 21, wherein said rigid rod is pivotably attached to said end of said steel tape so as to permit said rigid rod to pivot transversely relative to said tape as said rocker is pivoted from said first position to said second position.

23. The extension rod assembly of claim 7, wherein said tool head is a drywall flat finisher.

* * * * *